United States Patent
Li

(10) Patent No.: US 10,120,391 B2
(45) Date of Patent: Nov. 6, 2018

(54) SELF-BALANCING ENCLOSED MOTORCYCLE

(71) Applicant: Dong Li, Alhambra, CA (US)

(72) Inventor: Dong Li, Alhambra, CA (US)

( * ) Notice: Subject to any disclaimer, the term of this patent is extended or adjusted under 35 U.S.C. 154(b) by 0 days.

(21) Appl. No.: 15/620,649

(22) Filed: Jun. 12, 2017

(65) Prior Publication Data
US 2017/0277202 A1 Sep. 28, 2017

Related U.S. Application Data

(63) Continuation-in-part of application No. 12/775,437, filed on May 6, 2010.

(51) Int. Cl.
| | | |
|---|---|---|
| *G05D 1/08* | (2006.01) | |
| *B60K 31/12* | (2006.01) | |
| *B60R 21/013* | (2006.01) | |
| *B62K 11/02* | (2006.01) | |
| *B62J 17/08* | (2006.01) | |
| *B62J 99/00* | (2009.01) | |

(52) U.S. Cl.
CPC .......... *G05D 1/0891* (2013.01); *B60K 31/12* (2013.01); *B60R 21/013* (2013.01); *B60R 2021/01306* (2013.01); *B62J 17/08* (2013.01); *B62J 2099/002* (2013.01); *B62K 11/02* (2013.01); *B62K 2207/02* (2013.01); *G05D 2201/0213* (2013.01)

(58) Field of Classification Search
CPC .......... B60K 31/12; B60R 21/013; B60R 2021/01306; B60R 2021/0018; G05D 1/0891; G05D 2201/0213; B62K 2207/02

USPC ......................... 180/172, 219, 282
See application file for complete search history.

(56) References Cited

U.S. PATENT DOCUMENTS

| | | | | |
|---|---|---|---|---|
| 1,362,024 A | * | 12/1920 | McKee ................. | B62D 37/06 180/219 |
| 1,947,119 A | * | 2/1934 | Hollis ................... | B61B 13/04 105/141 |
| 3,124,007 A | * | 3/1964 | Swinney ................ | B62H 1/10 180/219 |
| 3,373,832 A | * | 3/1968 | Summers .............. | B62D 37/06 180/209 |
| 3,511,454 A | * | 5/1970 | Hamilton ............... | B64C 1/00 180/282 |
| 3,686,776 A | * | 8/1972 | Dahl ...................... | G01M 17/0076 434/61 |

(Continued)

*Primary Examiner* — Joseph M Rocca
*Assistant Examiner* — Maurice L Williams
(74) *Attorney, Agent, or Firm* — Tsz Lung Yeung

(57) ABSTRACT

A self-balancing enclosed motorcycle includes a platform base, a seat, a first wheel and a second wheel, a rear cabin, a door component and a gyroscope system. The gyroscope system includes a housing, a gyroscope sensor, a calculation device, an electrical coding device, a microprocessor, a servomotor, a vertical corrective rod movably extended from the servomotor, a first balancing assembly and a second balancing assembly. The first balancing assembly is mounted in the housing to engage with the vertical corrective rod. The second balancing assembly mounted in the housing at an opposite side of the first balancing assembly to engage with the vertical corrective rod. The vertical corrective rod is normally retained in a substantially vertical orientation with respect to the platform base.

8 Claims, 3 Drawing Sheets

(56) References Cited

U.S. PATENT DOCUMENTS

| | | | | | |
|---|---|---|---|---|---|
| 4,200,168 A * | 4/1980 | Moog | B62D 37/06 | | |
| | | | 104/118 | | |
| 4,447,069 A * | 5/1984 | Winiecki | B62J 27/00 | | |
| | | | 180/219 | | |
| 4,545,455 A * | 10/1985 | Kanemura | B60K 26/00 | | |
| | | | 123/198 D | | |
| 5,820,439 A * | 10/1998 | Hair, III | A63H 17/16 | | |
| | | | 446/233 | | |
| 6,223,104 B1 * | 4/2001 | Kamen | A61G 5/061 | | |
| | | | 180/7.1 | | |
| 6,360,838 B1 * | 3/2002 | Kulhavy | B62M 9/06 | | |
| | | | 180/219 | | |
| 6,685,208 B1 * | 2/2004 | Cowie | B62H 1/10 | | |
| | | | 280/293 | | |
| 7,195,487 B2 * | 3/2007 | Robbins | G05B 17/02 | | |
| | | | 434/61 | | |
| 7,497,294 B2 * | 3/2009 | Tsujii | B62K 11/06 | | |
| | | | 180/219 | | |
| 7,648,000 B2 * | 1/2010 | Kimura | B62K 21/005 | | |
| | | | 180/219 | | |
| 2003/0010554 A1 * | 1/2003 | Grong | B62M 9/06 | | |
| | | | 180/218 | | |
| 2003/0102657 A1 * | 6/2003 | Kuo | B62H 1/12 | | |
| | | | 280/755 | | |
| 2004/0256835 A1 * | 12/2004 | Royal, Sr. | B62H 1/12 | | |
| | | | 280/293 | | |
| 2005/0171672 A1 * | 8/2005 | Wallner | B60R 16/0232 | | |
| | | | 701/70 | | |
| 2006/0085111 A1 * | 4/2006 | Kojima | A63H 17/16 | | |
| | | | 701/38 | | |
| 2006/0175110 A1 * | 8/2006 | Lin | B62H 1/12 | | |
| | | | 180/219 | | |
| 2008/0017432 A1 * | 1/2008 | Chelen | B62J 27/00 | | |
| | | | 180/219 | | |
| 2008/0227365 A1 * | 9/2008 | Lo | A63H 17/21 | | |
| | | | 446/440 | | |
| 2008/0295595 A1 * | 12/2008 | Tacklind | A61G 5/14 | | |
| | | | 73/462 | | |
| 2009/0057048 A1 * | 3/2009 | Chien | B60G 17/0162 | | |
| | | | 180/282 | | |
| 2010/0075598 A1 * | 3/2010 | Ibrahim | A61N 1/3787 | | |
| | | | 455/41.1 | | |
| 2010/0090440 A1 * | 4/2010 | Reichstetter | B62H 7/00 | | |
| | | | 280/293 | | |
| 2012/0133116 A1 * | 5/2012 | Yun | B62H 1/12 | | |
| | | | 280/755 | | |

* cited by examiner

SELF-BALANCING ENCLOSED MOTORCYCLE

CROSS REFERENCE OF RELATED APPLICATION

This is a Continuation-In-Part application of a non-provisional application having an application Ser. No. 12/775,437 and a filing date of May 6, 2010. The contents of this specification are incorporated herein by reference.

BACKGROUND OF THE PRESENT INVENTION

Field of Invention

The present invention is directed to a self-balancing motorcycle, more particularly to a self-balancing motorcycle comprising an enclosed cabin to protect a driver from the environment.

Description of Related Arts

Traditional motorcycles require the driver to balance the vehicle. They also subject the driver to wind and rain, as well as hot and cold temperatures. The present invention features a self-balancing motorcycle with an enclosed cabin. The self-balancing enclosed motorcycle of the present invention may provide increased safety and comfort as compared to traditional motorcycles and may provide enhanced fuel efficiency as compared to traditional 4-wheel vehicles.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE PRESENT INVENTION

The present invention features a self-balancing enclosed motorcycle. The motorcycle comprises a platform base having one or more seats; a first wheel disposed at a front end of the platform base and a second wheel disposed at a back end of the platform base; a door component pivotally attached to the front end of the platform base, the door component functioning to enclose the seat on the platform base, wherein the door component can move between an open position and a closed position respectively allowing and preventing access to the seat; a window disposed in the door component for allowing a driver to view outside of the door component when the door component is closed; and a gyroscope system for providing balance. The gyroscope system comprises a vertical corrective rod operatively connected to symmetrical springs; a servomotor operatively connected to the vertical corrective rod; a microprocessor operatively connected to the servomotor; and a gyroscope sensor configured to detect skewing of the self-balancing motorcycle, the gyroscope sensor is operatively connected to a calculation device, the calculation device is operatively connected to an electrical coding device, the electrical coding device is operatively connected to the microprocessor; wherein the microprocessor is configured to receive an input signal from the gyroscope sensor via the calculation device and the electrical coding device, the input signal represents a direction the self-balancing motorcycle has skewed; wherein upon receipt of the input signal the microprocessor is configured to send an output command to the servomotor, the output command represents a means of overcoming the direction the self-balancing motorcycle has skewed; wherein the output command causes the servomotor to deliver torque to the vertical corrective rod to cause the vertical corrective rod to push the symmetrical springs accordingly so as to keep the self-balancing motorcycle upright.

In some embodiments, the door component can be secured in the closed position via locks. In some embodiments, the motorcycle further comprises an automatic hydraulic pressure stand that can extend out from the base when the motorcycle is stopped, the stand functioning to help balance the motorcycle when stopped. In some embodiments, the automatic hydraulic pressure stand is operatively connected to the microprocessor. In some embodiments, the motorcycle further comprises one or more exhaust covers disposed in the back end of the platform base.

In another aspect of the present invention, it provides a self-balancing motorcycle, comprising:

a platform base;

a seat disposed on the platform base;

a first wheel and a second wheel disposed on a front end portion and a back end portion of the platform base respectively;

a rear cabin supported by the platform base at a position above the second wheel;

a door component pivotally connected to the platform base in such a manner that the door component is capable of pivotally moving between an open position and a closed position, wherein in the open position, the door component is pivotally move to expose the seat to an exterior of the self-balancing enclosed motorcycle, wherein in the closed position, the door component is pivotally moved to substantially enclose the seat so as to prevent access to the seat; and a gyroscope system which is supported by the platform base, and comprises:

a housing having a receiving cavity mounted on the platform base;

a gyroscope sensor supported in the housing and configured for detecting skewing movement;

a calculation device supported in the housing and operatively connected to the gyroscope sensor;

an electrical coding device supported in the housing and operatively connected to the calculation device;

a microprocessor supported in the housing and electrically connected to the electrical coding device;

a servomotor supported in the housing and operatively connected to the microprocessor;

a vertical corrective rod supported in the housing and movably extended from the servomotor, the vertical corrective rod being normally retained in a substantially vertical orientation with respect to the platform base;

a first balancing assembly mounted in the housing to engage with the vertical corrective rod; and a second balancing assembly mounted in the housing at an opposite side of the first balancing assembly to engage with the vertical corrective rod, wherein when skewing of the self-balancing enclosed motorcycle is detected by the gyroscope sensor, the gyroscope is arranged to send a corresponding signal to the microprocessor which is arranged to send a control signal to the servomotor, the servomotor being arranged to deliver a predetermined torque to the vertical corrective rod so as to offset the skewing of the of the self-balancing enclosed motorcycle for automatically and dynamically maintaining a balanced position of the self-balancing enclosed motorcycle.

This summary presented above is provided merely to introduce certain concepts and not to identify any key or essential features of the claimed subject matter.

DETAILED DESCRIPTION OF THE PREFERRED EMBODIMENT

Figure 1:
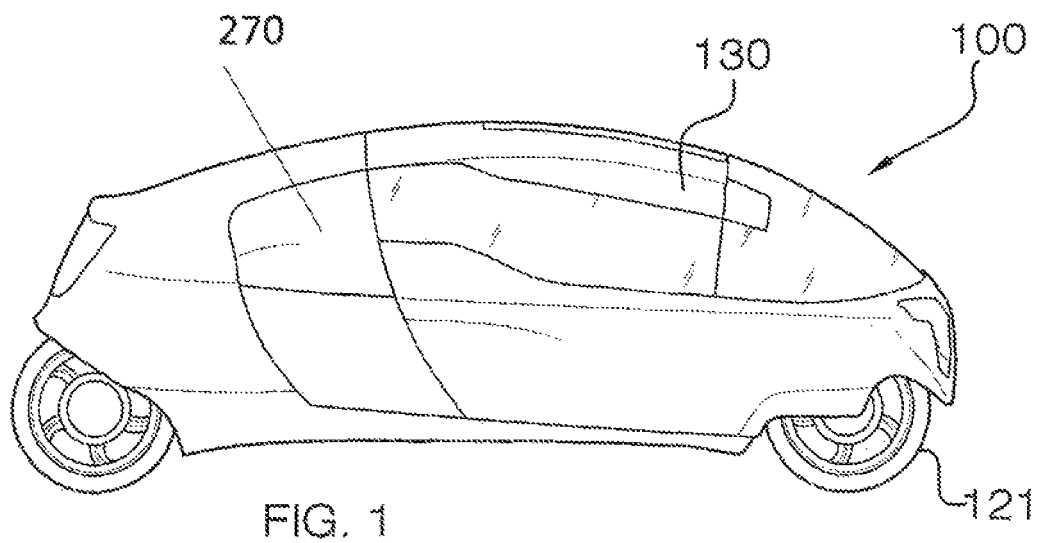
FIG. 1 is a side view of the view of the self-balancing enclosed motorcycle of the present invention, wherein the cabin is in the closed position.

The following detailed description of the preferred embodiment is the preferred mode of carrying out the invention. The description is not to be taken in any limiting sense. It is presented for the purpose of illustrating the general principles of the present invention.

Referring now to FIG. 1 to FIG. 5 of the drawings, the present invention features a self-balancing enclosed motorcycle 100. The self-balancing enclosed motorcycle 100 of the present invention may be constructed to accommodate one passenger, two passengers, three passengers, or four passengers.

The self-balancing enclosed motorcycle 100 of the present invention may comprise a platform base 110. One or more seats 115 may be disposed on a top surface of the platform base 110. A first wheel 121 is disposed at the front end of the platform base 110. A second wheel 122 may be disposed at the back end of the platform base 110. In some embodiments, a rear cabin 180 may be disposed atop a back end of the platform base 110 (e.g., also atop the second wheel 122).

Pivotally attached to the platform base 110 (e.g., at the front end) may be a door component 130. The door component 130 may move between an open position and a closed position respectively allowing and preventing access to the platform base 110 (e.g., the seats 115). The door component 130 may be designed to enclose the seats 115 on the platform base 110, similar to how the roof and windows of a standard car enclose the seats of the car. The door component 130 may fit around, atop, or adjacent to the rear cabin 180.

Figure 2:
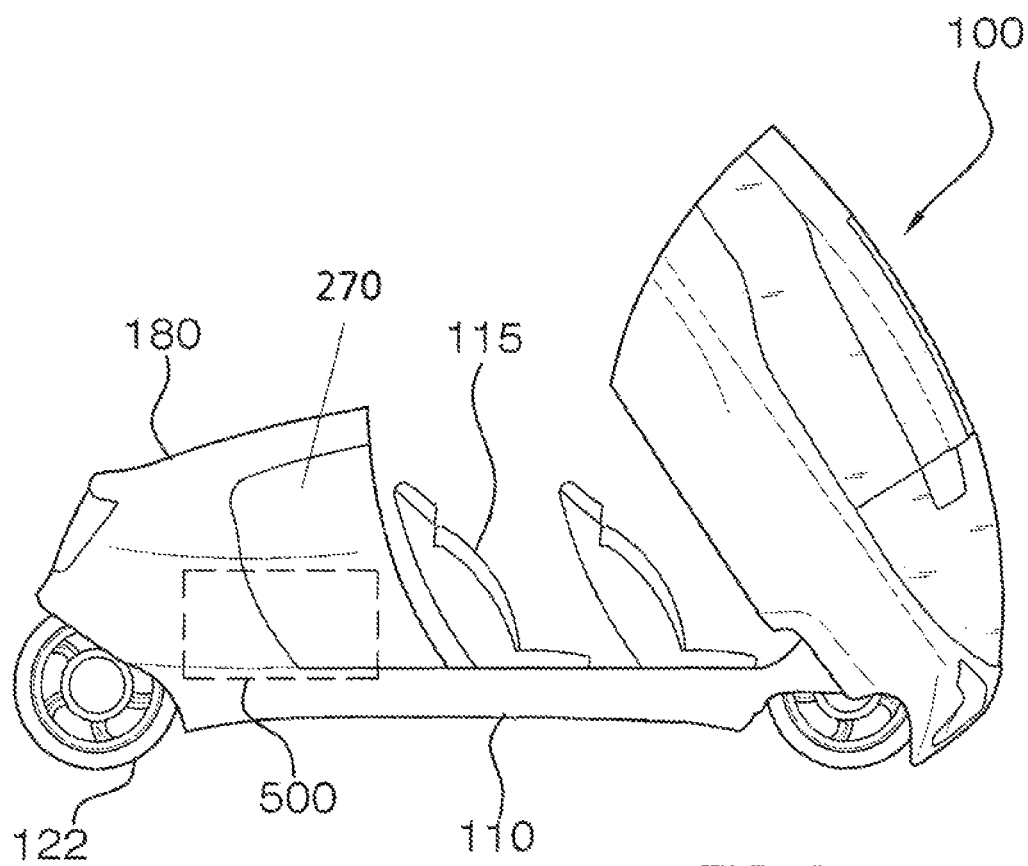
FIG. 2 is a side view of the self-balancing enclosed motorcycle of FIG. 1, wherein the cabin is in the open position.
Figure 3:
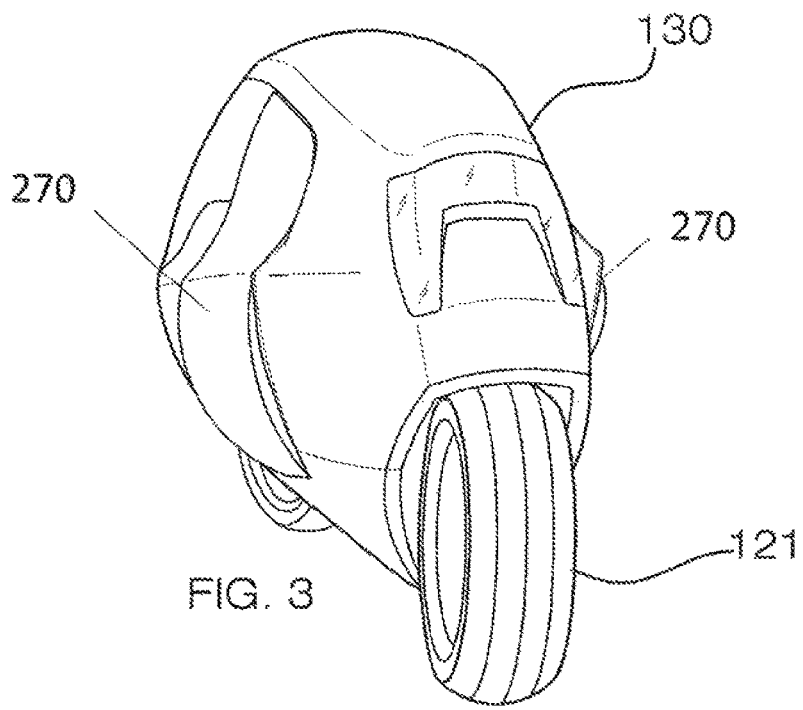
FIG. 3 is a perspective view of the self-balancing enclosed motorcycle of FIG. 1.

One or more windows 140 may be disposed in the door component 130 to allow a driver to view outside of the door component 130 when the door component 130 is closed. In some embodiments, the door component 130 may be secured in the closed position via locks. The door component 130 may be designed to be generally aerodynamically sound so as to improve fuel efficiency. For example, as shown in FIG. 1 to FIG. 3 of the drawings, the door component 130 may be generally rounded in contour.

The self-balancing enclosed motorcycle 100 of the present invention may further comprise one or more exhaust covers 270. As shown in FIG. 1 to FIG. 3 of the drawings, the exhaust covers 270 may be disposed on the sides of the self-balancing enclosed motorcycle 100 (e.g., in the back end of the platform base 110).

The self-balancing enclosed motorcycle 100 of the present invention may further comprise a gyroscope system 500 for providing balance to the self-balancing enclosed motorcycle 100. As shown in FIG. 2 of the drawings, the gyroscope system 500 may be disposed in the rear cabin 180. The gyroscope system 500 may not be limited to this position. The gyroscope system 500 may be operatively connected to a power source (e.g., a battery, an electrical system of the motorcycle, etc.). The gyroscope system 500 may comprise a gyroscope sensor 510 operatively connected to a calculation device 520. The calculation device 520 may be operatively connected to an electrical coding device 530, and the electrical coding device 530 may be operatively connected to a microprocessor 540. In some embodiments, the gyroscope sensor 510 and/or calculation device 520 and/or electrical coding device 530 and/or microprocessor 540 may be operatively connected to a servomotor 550.

Figure 4:
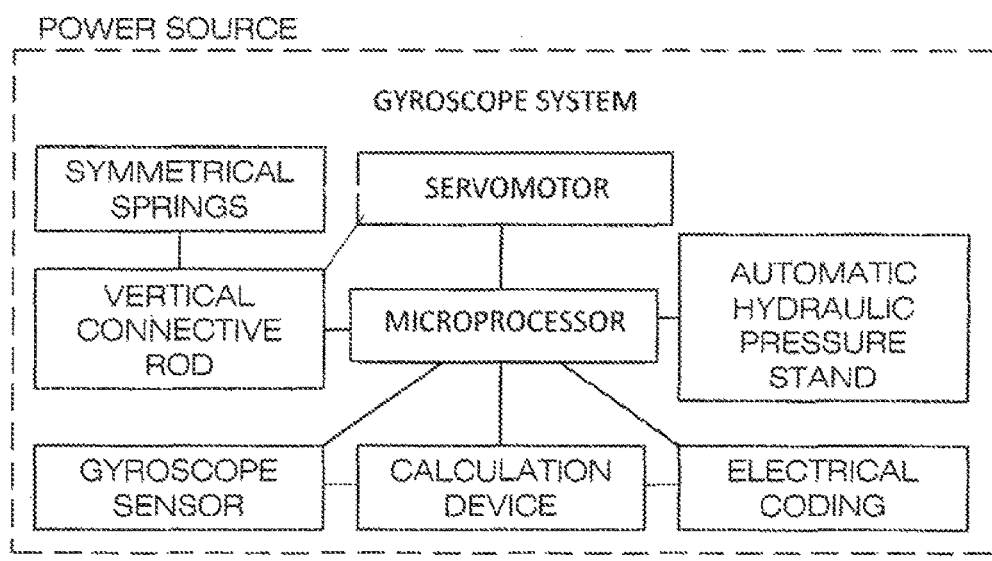
FIG. 4 is a schematic representation of the self-balancing enclosed motorcycle of the present invention.
Figure 5:
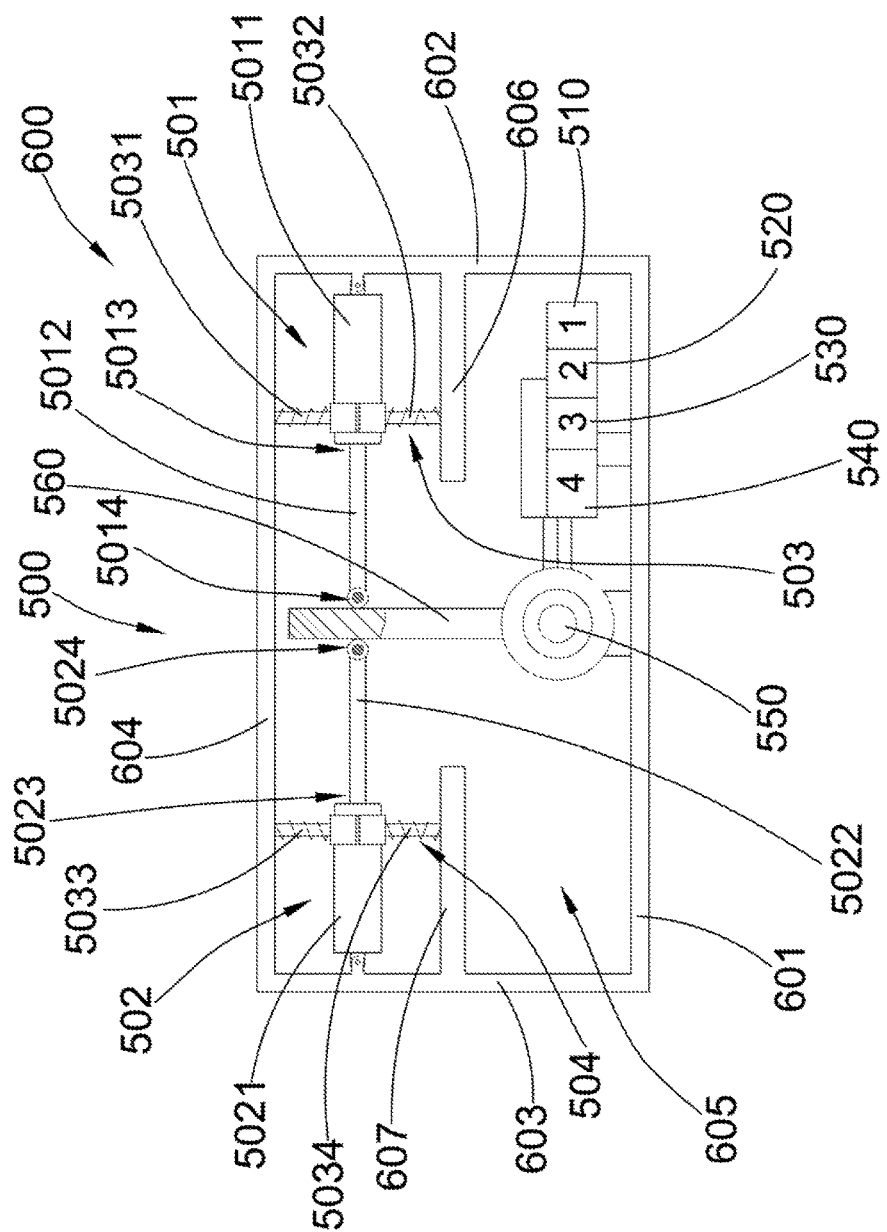
FIG. 5 is a side and schematic view of the gyroscope system of the motorcycle of the present invention.

The servomotor may further be operatively connected to a vertical corrective rod 560. The vertical corrective rod 560 may be operatively connected to symmetrical spring elements (will be described in more details below). The spring elements may be operatively connected to the servomotor 550 and/or the microprocessor. In some embodiments, both the servomotor 550 and the symmetrical springs elements may be operatively connected to a microprocessor 540. FIG. 4 and FIG. 5 show schematic representations of the operative connections of the gyroscope system 500 of the present invention.

The gyroscope sensor 510 may be configured to detect skewing (e.g., an off-balance situation) of the self-balancing enclosed motorcycle 100. The microprocessor 540 may be configured to receive input signals from the gyroscope sensor 510 via the calculation device 520 and the electrical coding device 530. The microprocessor 540 may be configured to send output commands to the servomotor 550 based on the input commands from the gyroscope sensor 510 (via the calculation device 520 and the electrical coding device 530). The servomotor 550 may be arranged to torque to the vertical corrective rod 560. In some embodiments, the vertical corrective rod 560 may push the symmetrical spring elements (e.g., attached to a controller) to keep the self-balancing enclosed motorcycle 100 upright and automatically balanced. Whatever direction the motorcycle 100 is skewed, the vertical corrective rod 560 may always be kept a substantially vertical position.

Referring to FIG. 5 of the drawings, the gyroscope system 500 may further comprise a housing 600 mounted on the platform base 110 of the self-balancing enclosed motorcycle 100. The housing 600 may have a bottom wall 601, a first side wall 602, a second side wall 603 and a top wall 604 to define a receiving cavity 605 as a space confined by the bottom wall 601, the first side wall 602, the second side wall 603 and the top wall 604. The receiving cavity 605 may be arranged for securely accommodating the gyroscope sensor 510, the calculation device 520, the electrical coding device 530, the microprocessor 540, and the servomotor 550. The housing 600 may further has a first supporting member 606 and a second supporting member 607 inwardly extended from the first side wall 602 and the second side wall 603 respectively.

The servomotor 550 may be secured in a mid-portion of the receiving cavity 605 on the bottom wall 601. The vertical corrective rod 560 may be connected to the servomotor 550 in such a manner that the vertical corrective rod 560 may pivotally and controllably move with respect to the servomotor 550. The gyroscope system 500 may further comprise a first balancing assembly 501 and a second balancing assembly 502 supported in the receiving cavity 605 of the housing 600 at positions on two sides of the vertical corrective rod 560 respectively.

Specifically, the first balancing assembly 501 may comprise a first balancing base 5011 and a first balancing member 5012 extended from the first balancing base 5011. In the preferred embodiment of the present invention, the first balancing base 5011 may be pivotally mounted on the first side wall 602 of the housing 600 while the first balancing member 5012 may be configured as an elongated rod and may have a first fixed end portion 5013 securely connected to the first balancing base 5011, and a first sliding end portion 5014 slidably engaging with the vertical corrective rod 560.

Similarly, the second balancing assembly 502 may comprise a second balancing base 5021 and a second balancing member 5022 extended from the second balancing base 5021. The second balancing base 5021 may be pivotally mounted on the second side wall 603 of the housing 600 while the second balancing member 5022 may be configured as an elongated rod and may have a second fixed end portion 5023 securely connected to the second balancing base 5021, and a second sliding end portion 5024 slidably engaging with the vertical corrective rod 560.

The first balancing assembly 501 may further comprise a first suspension arrangement 503 mounted between the first balancing assembly 501 and the housing 600 for suspendedly supporting the first balancing assembly 501 in the receiving cavity 605. Specifically, the first suspension arrangement 503 may comprise a first spring element 5031 mounted between the first balancing base 5011 and a top wall 604 of the housing 600, and a second spring element 5032 mounted between the first balancing base 5011 and the first supporting member 606. The first spring element 5031 and the second spring element 5032 may support the first balancing assembly 501 in the receiving cavity 605 in a suspendedly movable manner.

Similarly, the second balancing assembly 502 may further comprise a second suspension arrangement 504 mounted between the second balancing assembly 502 and the housing 600 for suspendedly supporting the second balancing assembly 502 in the receiving cavity 605. Specifically, the second suspension arrangement 504 may comprise a third spring element 5033 mounted between the second balancing base 5021 and the top wall 604 of the housing 600, and a fourth spring element 5034 mounted between the second balancing base 5021 and the second supporting member 607. The third spring element 5033 and the fourth spring element 5034 may support the second balancing assembly 502 in the receiving cavity 605 in a suspendedly movable manner.

The operation of the present invention may be as follows: the self-balancing enclosed motorcycle 100 may travel on a road. The gyroscope system 500 may be arranged to ensure balancing of the self-balancing enclosed motorcycle 100. The gyroscope sensor 510 may be arranged to detect skewing of the self-balancing enclosed motorcycle 100. When skewing is detected, a corresponding signal may be transmitted to the microprocessor 540 through the calculation device 520 and the electrical coding device 530. The microprocessor 540 may then process the skewing and command the servomotor 550 to counter the skewing of the self-balancing enclosed motorcycle 100.

The microprocessor 540 may drive the servomotor 550 to operate so as to drive the vertical corrective rod 560 to pivotally move with respect to the servomotor 550 so as to counter the skewing effect of the self-balancing enclosed motorcycle 100. In other words, the vertical corrective rod 560 may pivotally move toward either the first balancing assembly 501 or the second balancing assembly 502 due to the skewing of the self-balancing enclosed motorcycle 100.

When the vertical corrective rod 560 moves toward the first balancing assembly 501, the first sliding end portion 5014 of the first balancing member 5012 may slide along an outer surface of the vertical corrective rod 560 while the first balancing base 5011 may pivotally move with respect to the housing 600. These movements may slightly deform the first spring element 5031 and the second spring element 5032.

At the same time, when the vertical corrective rod 560 moves toward the first balancing assembly 501, the second sliding end portion 5024 of the second balancing member 5022 may also slide along an outer surface of the vertical corrective rod 560 in a direction opposite to that of the first sliding end portion 5014, while the second balancing base 5021 may pivotally move with respect to the housing 600 in a direction opposite to that of the first balancing base 5011. These movements may slightly deform the third spring element 5033 and the fourth spring element 5034.

Conversely, when the vertical corrective rod 560 moves toward the second balancing assembly 502, the second sliding end portion 5024 of the second balancing member 5022 may slide along an outer surface of the vertical corrective rod 560 while the second balancing base 5021 may pivotally move with respect to the housing 600. These movements may slightly deform the third spring element 5033 and the fourth spring element 5034. At the same time, when the vertical corrective rod 560 moves toward the second balancing assembly 502, the first sliding end portion 5014 of the first balancing member 5012 may also slide along an outer surface of the vertical corrective rod 560 in a direction opposite to that of the second sliding end portion 5024, while the first balancing base 5011 may pivotally move with respect to the housing 600 in a direction opposite to that of the second balancing base 5021. These movements may slightly deform the first spring element 5031 and the second spring element 5032.

When the vertical corrective rod 560 moves toward the first balancing assembly 501 or the second balancing assembly 502, the microprocessor 540 may drive the servomotor 550 to drive the vertical corrective rod 506 to pivotally move in a direction which may counter the skewing effect. The result is that the vertical corrective rod 506 may always be kept in a substantially vertical orientation with respect to the platform base 110. The first and the second spring elements 5031, 5032 may also exert a biasing force to try to move the first supporting member back 606 to its original position so as to maintain the vertical corrective rod 506 in its vertical position. Similarly, the third and the fourth spring elements 5033, 5034 may also exert a biasing force to try to move the second supporting member 607 back to its original position so as to maintain the vertical corrective rod 506 in its vertical position.

The self-balancing enclosed motorcycle 100 of the present invention may be maintained upright and balanced even when the self-balancing enclosed motorcycle 100 stops. In some embodiments, the self-balancing enclosed motorcycle 100 of the present invention may further comprise an automatic hydraulic pressure stand that can extend in and out from the motorcycle 100 (e.g., the base 110). The stand can help balance the self-balancing enclosed motorcycle 100 when the self-balancing enclosed motorcycle 100 is stopped. For example, in some embodiments, before the motorcycle stops, the automatic hydraulic pressure stand automatically extends out to stabilize the motorcycle, and then the motorcycle can shut down. The automatic hydraulic pressure stand may be operatively connected to the microprocessor 540.

The following the disclosures of the following U.S. Patents are incorporated in their entirety by reference herein: U.S. Pat. No. 3,465,840; U.S. Pat. Application No. 2006/0175110; U.S. Pat. No. 5,685,388; U.S. Pat. Application No. 2002/0027037; U.S. Pat. No. 7,131,650; U.S. Pat. No. 5,378,020; U.S. Pat. No. 6,170,847; U.S. Pat. No. 6,360,838; U.S. Pat. No. 6,637,763.

The present invention, while illustrated and described in terms of a preferred embodiment and several alternatives, is not limited to the particular description contained in this specification. Additional alternative or equivalent components could also be used to practice the present invention.

What is claimed is:

1. A self-balancing enclosed motorcycle comprising:
   a platform base;
   a seat disposed on said platform base;
   a first wheel and a second wheel disposed on a front end portion and a back end portion of said platform base respectively;
   a rear cabin supported by said platform base at a position above said second wheel;
   a door component pivotally connected to said platform base in such a manner that said door component is capable of pivotally moving between an open position and a closed position, wherein in said open position, said door component is pivotally move to expose said seat to an exterior of said self-balancing enclosed motorcycle, wherein in said closed position, said door component is pivotally moved to substantially enclose said seat so as to prevent access to said seat; and
   a gyroscope system which is supported by said platform base, and comprises:
   a housing having a receiving cavity mounted on said platform base, said housing having a bottom wall, a first side wall, a second side wall, a top wall, a first supporting member inwardly extended from said first side wall, and a second supporting member inwardly extended from said second side wall;
   a gyroscope sensor supported in said housing and configured for detecting skewing movement;
   a calculation device supported in said housing and operatively connected to said gyroscope sensor;
   an electrical coding device supported in said housing and operatively connected to said calculation device;
   a microprocessor supported in said housing and electrically connected to said electrical coding device;
   a servomotor supported in said housing and operatively connected to said microprocessor;
   a vertical corrective rod supported in said housing and movably extended from said servomotor, said vertical corrective rod being normally retained in a substantially vertical orientation with respect to said platform base;
   a first balancing assembly mounted in said housing to engage with said vertical corrective rod; and
   a second balancing assembly mounted in said housing at an opposite side of said first balancing assembly to engage with said vertical corrective rod, wherein when skewing of said self-balancing enclosed motorcycle is detected by said gyroscope sensor, said gyroscope is arranged to send a corresponding signal to said microprocessor which is arranged to send a control signal to said servomotor, said servomotor being arranged to deliver a predetermined torque to said vertical corrective rod so as to offset said skewing of said of said self-balancing enclosed motorcycle for automatically and dynamically maintaining a balanced position of said self-balancing enclosed motorcycle;
   said first balancing assembly comprising a first balancing base and a first balancing member extended from said first balancing base, said first balancing base being pivotally mounted on said first side wall of said housing while said first balancing member being configured as an elongated rod, said first balancing member having a first fixed end portion securely connected to said first balancing base, and a first sliding end portion slidably engaging with said vertical corrective rod, in such a manner that when said vertical corrective rod moves toward said first balancing assembly, said first sliding end portion of said first balancing member is arranged to slide along an outer surface of said vertical corrective rod while said first balancing base pivotally moves with respect to said housing.

2. The self-balancing enclosed motorcycle, as recited in claim 1, wherein said second balancing assembly comprises a second balancing base and a second balancing member extended from said second balancing base, said second balancing base being pivotally mounted on said second side wall of said housing while said second balancing member being configured as an elongated rod, said second balancing member having a second fixed end portion securely connected to said second balancing base, and a second sliding end portion slidably engaging with said vertical corrective rod, in such a manner that when said vertical corrective rod moves toward said second balancing assembly, said second sliding end portion of said second balancing member is arranged to slide along an outer surface of said vertical corrective rod while said second balancing base pivotally moves with respect to said housing.

3. The self-balancing enclosed motorcycle, as recited in claim 2, wherein said first balancing assembly further comprises a first suspension arrangement mounted between said first balancing assembly and said housing for suspendedly supporting said first balancing assembly in said receiving cavity at a position above said first supporting member.

4. The self-balancing enclosed motorcycle, as recited in claim 3, wherein said first suspension arrangement comprises a first spring element mounted between said first balancing base and a top wall of said housing, and a second spring element mounted between said first balancing base and said first supporting member.

5. The self-balancing enclosed motorcycle, as recited in claim 4, wherein said second balancing assembly further comprises a second suspension arrangement mounted between said second balancing assembly and said housing for suspendedly supporting said second balancing assembly in said receiving cavity at a position above said second supporting member.

6. The self-balancing enclosed motorcycle, as recited in claim 5, wherein said second suspension arrangement comprises a third spring element mounted between said second balancing base and said top wall of said housing, and a fourth spring element mounted between said second balancing base and said second supporting member.

7. The self-balancing enclosed motorcycle, as recited in claim 6, wherein said door component has a window formed thereon.

8. The self-balancing enclosed motorcycle, as recited in claim 6, further comprising a plurality of exhaust covers provided on two sides thereof.

* * * * *